United States Patent
Souvatzidis

(10) Patent No.: US 6,460,895 B1
(45) Date of Patent: Oct. 8, 2002

(54) BRAKE HOSE SLEEVE

(75) Inventor: Achille Souvatzidis, White Lake, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/861,994

(22) Filed: May 21, 2001

(51) Int. Cl.⁷ .................................................. F16L 13/04
(52) U.S. Cl. ........................ 285/115; 285/114; 285/116; 138/110
(58) Field of Search ................................ 285/114, 115, 285/116; 138/110

(56) References Cited

U.S. PATENT DOCUMENTS 1,774,707 A * 9/1930 Gau ........................... 285/114
2,877,437 A * 3/1959 Flanagan, Jr. ............... 285/116
5,816,622 A * 10/1998 Carter ......................... 138/110

FOREIGN PATENT DOCUMENTS

GB          2113118 A   *  11/1983

* cited by examiner

Primary Examiner—Lynne H. Browne
Assistant Examiner—Aaron Dunwoody
(74) Attorney, Agent, or Firm—Laura C. Hargitt

(57) ABSTRACT

A brake hose sleeve composed of rigid plastic which has a throat structured to positively (snappingly) interfit with respect to the annular crimp cavity of the fitting into which the brake hose is sealingly attached. The throat is located at an end of the brake hose sleeve, and is characterized by an annular recess defined by an annular recess wall and a plurality of mutually spaced and axially oriented ribs. Each rib has a convex contour which interfits with the concave contour of the annular crimp cavity of the fitting.

10 Claims, 3 Drawing Sheets

BRAKE HOSE SLEEVE

TECHNICAL FIELD

The present invention relates to automotive brake systems, and more particularly to a plastic sleeve placed over a brake hose to provide brake hose orientation along a pre-set path.

BACKGROUND OF THE INVENTION

Automotive braking systems utilize hydraulic lines to ensure proper pressure distribution to the brakes at the wheels of the vehicle. Because the hydraulic pressure is critical, the hydraulic lines are preferably in the form of rigid metallic tubing except in locations where flexibility is required. For example, all the wheels are subject to bounce, and the front wheels are further subject to turning. Accordingly, to accommodate these movements, the hydraulic lines include one or more segments which are composed of a flexible brake hose. Brake hoses typically are composed of a hydraulic grade reinforced elastomeric material which provides long-term flexibility.

In that the brake hose runs between an upline location and a downline location, the two locations being movable relative to each other, it is desirable to locate the brake hose so that these movements do not result in the brake hose becoming pinched or interferingly involved with any adjacent vehicular components. In the prior art, it is known to utilize an elastomeric sleeve to provide a pre-set routing for the brake hose which thereby renders the brake hose safe from these concerns.

FIGS. 1 and 2 depict a conventional brake hose 10 connected to a brake line terminal 12 having an integral fitting 14 into which an end 16 of the bake hose is placed and then crimped sealingly thereover. The crimp 18 is in the form of an annular crimp cavity 20 at the outer surface 22 of the fitting, wherein the trough 24 of the annular crimp cavity oppositionally corresponds to an apex 26 at the inner surface 28 of the fitting which provides a sealed fit between the brake hose and the fitting. In order to keep the brake hose 10, which is flexible, at a predetermined path even as movement between the upline and downline locations transpire, it is conventional for an elastomeric sleeve 29 to be press fit over the brake hose at the fitting 14 (one of the upline and downline locations), extending from the brake line terminal 12 to a selected location distal therefrom (for example about 2.5 inches). The preferred elastomeric sleeve has a uniform inner through bore 30 and is generally composed of ethylene propylene diene monomer (EPDM), which provides a resiliency resistant to flexing in view of its relatively thick sidewall (for example, on the order of one-quarter inch in relation to an outside diameter on the order of one inch).

The elastomeric sleeve has a number of drawbacks. Among these, for example, are bending of the elastomeric sleeve in response to lateral stresses, cost of application, piece cost, and lack of rotational freedom. With regard to the latter drawback, when the elastomeric sleeve is pressed onto the fitting, the tight fit creates a high frictional interaction between the elastomeric sleeve and the fitting which prevents the elastomeric sleeve from freely rotating with respect to the brake hose This creates an undesirable coaction therebetween as the various motions between the upline and downline locations transpire over the life of the vehicle.

Therefore, what remains needed in the art is a simple, inexpensive, and easily attached brake hose sleeve.

SUMMARY OF THE INVENTION

The present invention is a brake hose sleeve composed of plastic which has a throat structured to positively interfit (that is, to snap onto with a tightly held orientation) with respect to the annular crimp cavity of the fitting into which the brake hose is sealingly attached.

The brake hose sleeve according to the present invention has an inner through bore which communicates with a throat located at an end of the brake hose sleeve. The throat is characterized by an annular recess defined by an annular recess wall and a plurality of mutually spaced and axially oriented ribs. Each rib has a convex contour which is reciprocal with respect to the concave contour of the annular crimp cavity of the fitting so that a positive interfit is generated therebetween.

In operation, as the throat of the brake hose sleeve is pressed over the wide end of the fitting, the convex shape of the ribs positively interfits into the concave shape of the annular crimp cavity, thereby seating the brake hose sleeve onto the fitting. By the term "positively interfit" is meant that the ribs automatically snap into a seated position on the annular crimp cavity, whereupon the sleeve is retained at a tightly held orientation which has little to no off-axis squirm with respect to the fitting, yet rotation therebetween is allowed. In this regard, the ribs interaction with the annular crimp cavity provides a self-alignment with respect to the fitting, and error-proofs the assembly process. This is because the seating of the brake hose sleeve occurs when the ribs interfit with the annular crimp cavity, independently of whether the end of the brake hose sleeve has abutted the brake line terminal and/or independently of whether the annular recess wall has abutted the end of the fitting. The brake hose sleeve is now able to rotate relative to the fitting and the brake hose, and the plastic supplies a preset path rigidity to the brake hose.

Accordingly, it is an object of the present invention to provide a brake hose sleeve which interfits with the annular crimp cavity of a fitting crimpably connected to a brake hose.

This and additional objects, features and advantages of the present invention will become clearer from the following specification of a preferred embodiment.

DESCRIPTION OF THE PREFERRED EMBODIMENT

Figure 1:
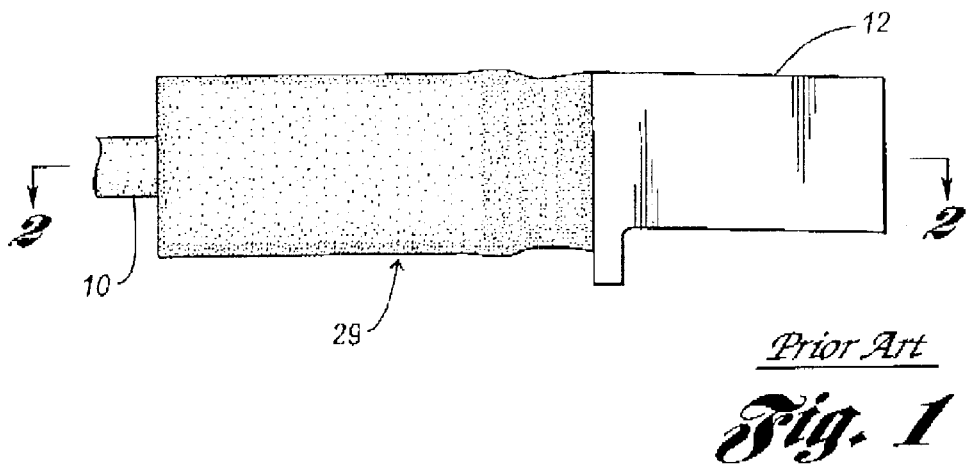
FIG. 1 is a side view of a prior art elastomeric brake hose sleeve shown having received a brake hose and resiliently retained on a fitting of a brake line terminal.
Figure 2:
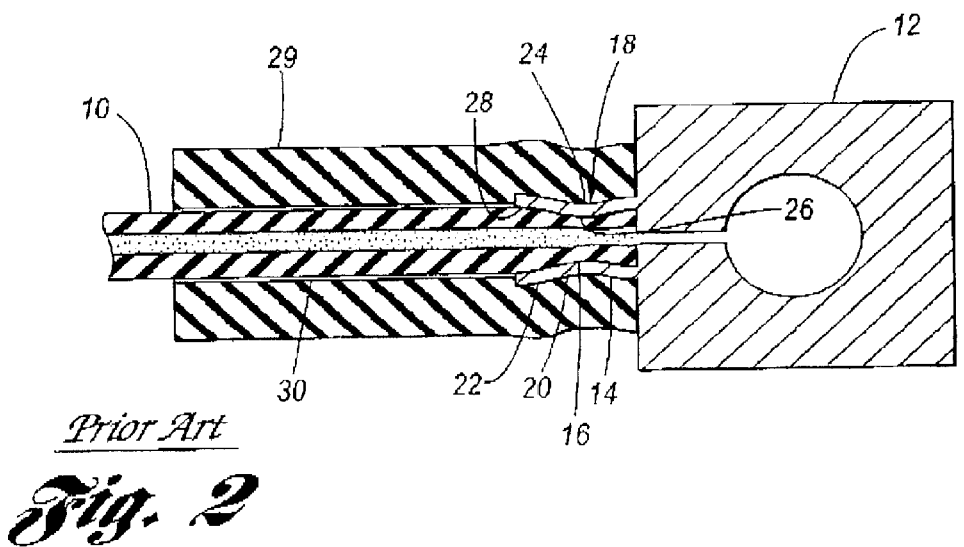
FIG. 2 is sectional view, taken along line 2—2 of FIG. 1.
Figure 3:
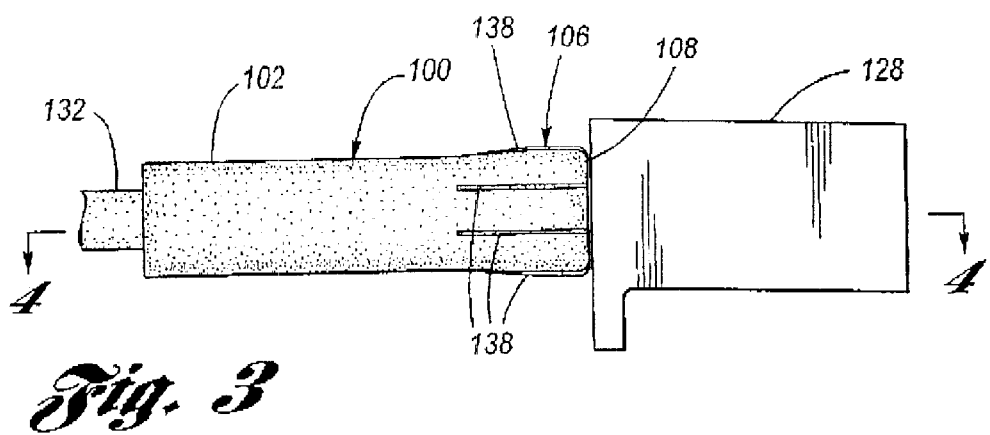
FIG. 3 is a side view of a brake hose sleeve according to the present invention, shown in operation having received a brake hose and positively interfitted with respect to a fitting of a brake line terminal.

Referring now to the Drawing, FIGS. 3 through 9 depict an example of a brake hose sleeve 100 according to the present invention.

The brake hose sleeve has a cylindrical sidewall 102 which defines an inner through bore 104. The preferred material of the sidewall 102 is plastic, particularly nylon 6.6, or equivalent. The type of plastic preferred provides sidewall rigidity even though the sidewall is thin. For example, rigidity of the sidewall is provided given an inner through bore diameter of 11 mm and an outside diameter of 17 mm (wherein the sidewall thickness is 3 mm and the length is 65 mm). The dimensions of the sidewall will vary to suit a particular fitting, brake hose and environment of installation.

At an end portion 106 of the brake hose sleeve 100 (the subject end being referred to hereafter as the throat end 108), the through bore 104 communicates with a throat 110. The throat 110 is characterized by an annular recess 112 formed in the sidewall 102 at the inner through bore 104 and demarcated by an annular recess wall 114. Adjacent the annular recess wall 114, a plurality of ribs 116 are integrally formed at the annular recess 112. The ribs 116 are oriented axially in relation to a central axis A of the inner through bore 104 and are upstanding in relation to the annular recess 112.

Figure 5:
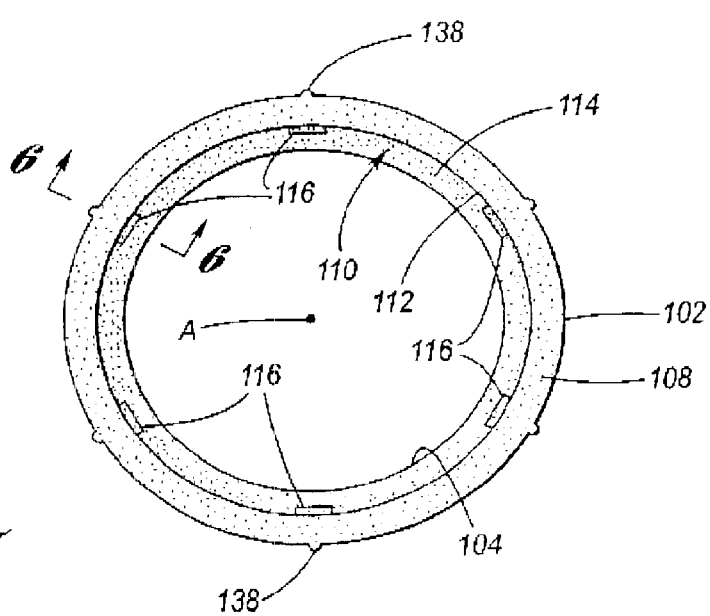
FIG. 5 is a throat end view of the brake hose sleeve according to the present invention.
Figure 6:
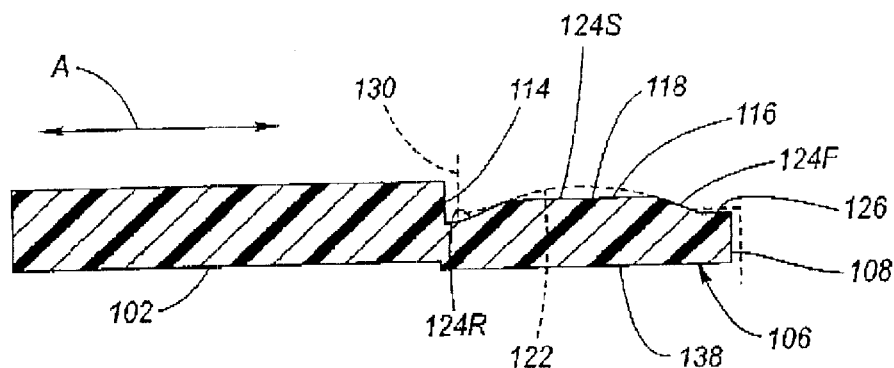
FIG. 6 is a broken-away sectional view, taken along line 6—6 in FIG. 5.

Each of the ribs 116 has a convexly contoured upper surface 118 which is predetermined so as to reciprocally complement concavely contoured annular crimp cavity 120 of a particular fitting 122 to which the brake hose sleeve 100 is intended to mate, as shown best at FIG. 6 (whereat the fitting is shown in phantom). The ribs 116 are preferably arranged in opposing pairs, the number of pairs being preselected to provide a guided interfit to the annular crimp cavity, as for example six, as shown at FIG. 5.

While the convex shape of the upper surface 118 of the ribs may be configured as selected to best positively interfit with th concave shape of a particular annular crimp cavity, FIG. 6 shows an example of a convex shape, wherein the upper surface 118 has forward and rearward bevels 124F, 124R which are located at either end of a straight segment 124S. The height of the upper surface 118 is predetermined to provide a suitably tight and squirm free fit (relative to the center axis) relative to the annular crimp cavity. An example thereof is depicted at FIG. 6, wherein the height of the straight segment 124S is about one-half the height of the annular recess wall 114. It is preferred to located the ribs 116 spaced from both the annular recess wall 114 and (more distantly) from the throat end 108 so as to provide a prestage feature 126 (discussed hereinbelow).

Figure 4:
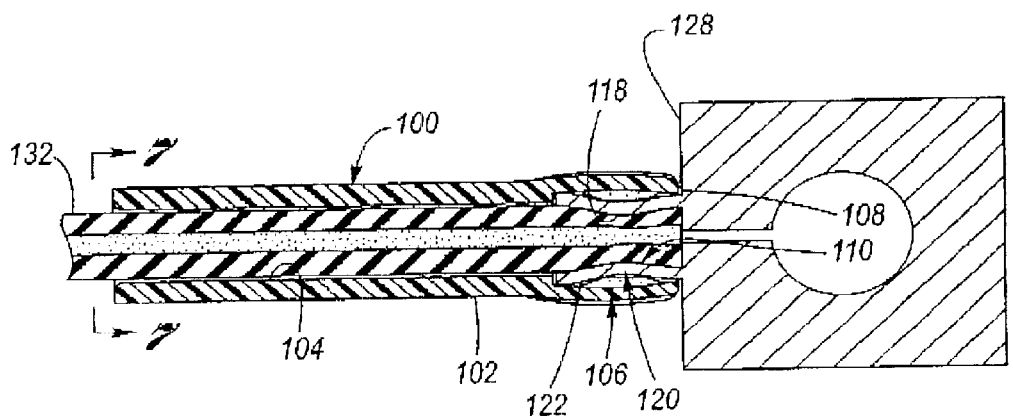
FIG. 4 is a sectional view, taken along line 4—4 in FIG. 3.
Figure 7:
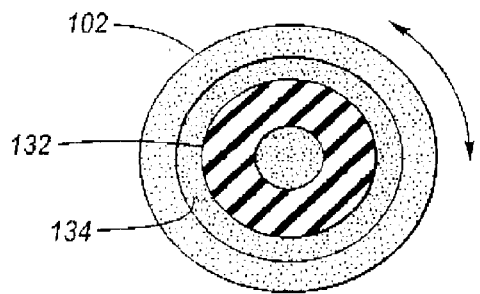
FIG. 7 is a partly sectional view, taken along line 7—7 in FIG. 4.
Figure 8:
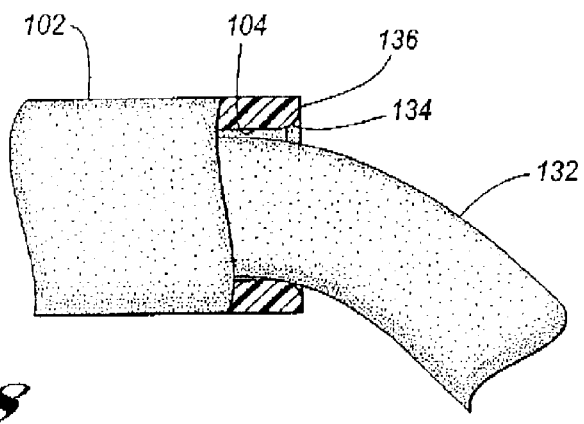
FIG. 8 is a broken-away, partly sectional side view at a rear end of the brake hose sleeve, showing accommodation thereat or brake hose flex.

It will be noticed from FIGS. 4 and 6, when the brake hose sleeve 100 is seated on the fitting 122, the interaction of the ribs 116 with the annular crimp cavity 120 provides a self-alignment with respect to the fitting 122, and error-proofs the assembly process (discussed hereinbelow). In this regard, the seating of the brake hose sleeve 100 occurs when the ribs 116 pass over the wide end of the fitting and begin entry into the annular crimp cavity 120. Now, a positive interfit ensues wherein the ribs 116 automatically snap into the annular crimp cavity 120 independently of whether the throat end 108 of the brake hose sleeve has abutted the brake line terminal 128 and/or independently of whether the annular recess wall 114 has abutted the fitting end 130. At this mounted location, the sidewall 102 of the brake hose sleeve is now able to rotate relative to the fitting 122 and the brake hose 132, as shown at FIG. 7. Further, the plastic of the sidewall 102 supplies a preset path rigidity to the brake hose 132 located within the inner through bore 104. In this regard, it is preferred to provide a radiused chamfer 134 in the sidewall 102 at the rear end 136 of the inner through bore 104 so as to accommodate thereat pronounced flexing of the brake hose 132, as for example shown at FIG. 8.

Figure 9:
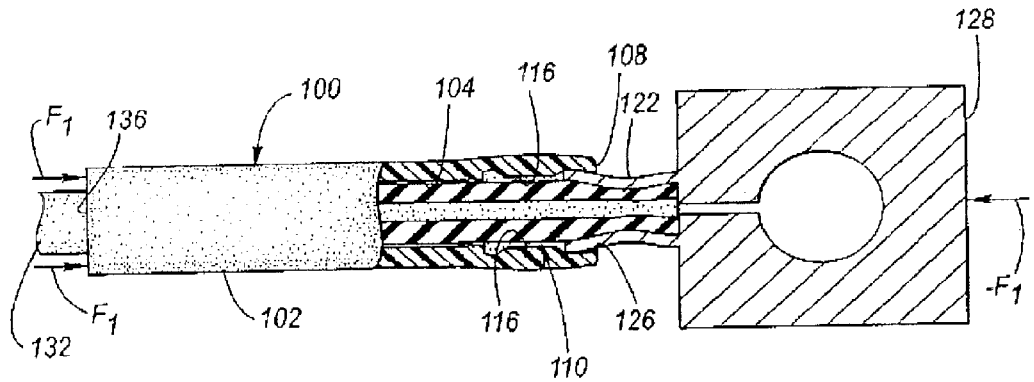
FIG. 9 is a partly sectional view, wherein the brake hose sleeve is shown prestaged with respect to the fitting.

FIG. 9 depicts an assembly process. With a brake hose 132 crimpingly sealed to the fitting 122 and the brake hose passing through the inner through bore 104, the throat end 108 of the sidewall 102 is brought to the fitting end 128. The prestage feature 126 allows for the fitting end 130 to be easily pressed into the throat 110 until it abuts the ribs 116. For purposes of assembly, a jig is used to apply force $F_1$, to the rear end 136 and an opposite force $-F_1$ is applied to the brake line terminal 128, thereby causing the throat to press onto the fitting and positively seating the ribs into the annular crimp cavity. To reinforce the sidewall as it expands over and onto the fitting, and/or to provide an external indication of the ribs placement, riblets 138 may be integrated externally with the sidewall at locations corresponding to each (internally placed) rib 116.

Advantages of the brake hose sleeve 100 in relation to the conventional elastomeric sleeve 28 include: reduced manufacturing cost, easier snap-in assembly, enhanced product quality of nylon 6.6 versus EPDM, reduced weight, much thinner sidewall thickness (which can be critical in tight clearance environments), greater rigidity which provides better brake hose location in spite of lateral force applications and assembly ease, positive interfitting wherein self-centering of the ribs vis-a-vis the annular crimp cavity obviates location gauging, need for over-stroke during assembly and need for retention devices and/or adhesives, friendlier (dissimilar material) contact between the brake hose and the sidewall, lack of rotation drag (the sidewall can rotate relative to the fitting and brake hose), and radiused chamfering at the rear end of the sidewall which helps prevent brake hose fatigue.

To those skilled in the art to which this invention appertains, the above described preferred embodiment may be subject to change or modification. Such change or modification can be carried out without departing from the scopeof the invention, which is intended to be limited only by the scope of the appended claims.

I claim:

1. A brake line assembly, comprising:

a flexible brake hose having an end;

a fitting receiving said end of said brake hose, said fitting having an annular crimp which sealingly attaches the brake hose to the fitting, said annular crimp forming a concavely shaped annular crimp cavity; and a sleeve comprising a cylindrical sidewall defining an inner through bore having a center axis, an end portion of said sidewall having a throat communicating with said inner through bore, said throat comprising an annular recess, and a plurality of ribs located at said annular recess, each rib of said plurality of ribs being oriented parallel to said axis and a convexly shaped upper surface which is contoured so as to generally reciprocally complement said annular crimp cavity;

wherein said sleeve is positively interfitted with respect to said annular crimp cavity such that said sleeve is held tightly on said fitting and is simultaneously rotatable therewith.

2. The sleeve of claim 1, wherein said sidewall is composed of a rigid plastic material.

3. The sleeve of claim 1, wherein said plurality of ribs comprise a plurality of pairs of ribs, wherein the ribs of each pair of ribs are diametrically disposed relative to each other at said annular recess.

4. The sleeve of claim 1, wherein said sidewall has a rear end distal from said end portion, said rear end having a radiused chamfer at said inner through bore.

5. The sleeve of claim 1, wherein said sleeve is freely rotatable with respect to said fitting and said brake hose.

6. The sleeve of claim 1, wherein said annular recess demarcated with respect to said inner through bore by an annular recess wall.

7. The sleeve of claim 2, wherein said plurality of ribs comprise a plurality of pairs of ribs, wherein the ribs of each pair of ribs are diametrically disposed relative to each other at said annular recess.

8. The sleeve of claim 7, wherein said sidewall has a rear end distal from said end portion, said rear end having a radiused chamfer at said inner through bore.

9. The sleeve of claim 8, wherein said sleeve is freely rotatable with respect to said fitting and said brake hose.

10. The sleeve of claim 9, wherein said annular recess demarcated with respect to said inner through bore by annular recess wall.

* * * * *